Aug. 9, 1955
W. W. WARD ET AL
2,714,865
SEPARABLE PANEL BOAT CABIN CONSTRUCTION
Filed Aug. 31, 1953
2 Sheets-Sheet 1
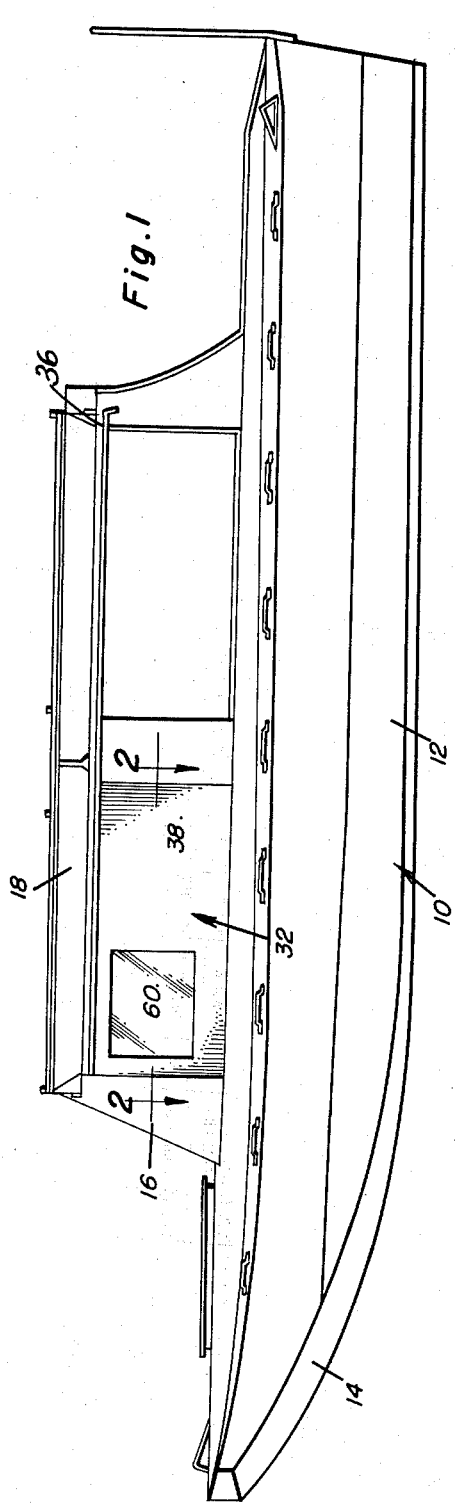
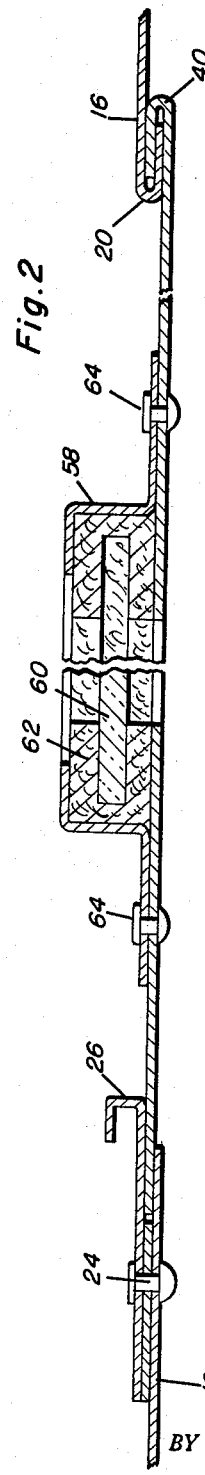
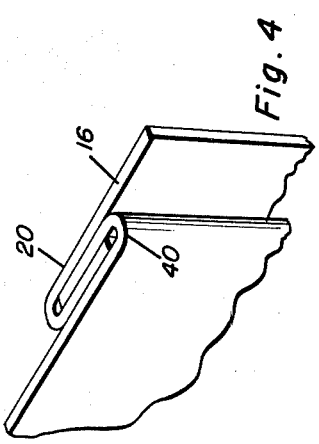
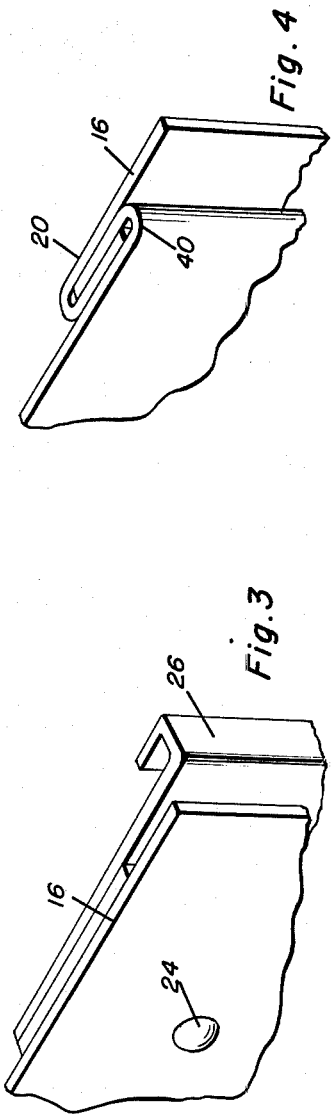
William W. Ward
Milton H. Ward
INVENTORS Aug. 9, 1955  W. W. WARD ET AL  2,714,865
SEPARABLE PANEL BOAT CABIN CONSTRUCTION
Filed Aug. 31, 1953  2 Sheets-Sheet 2
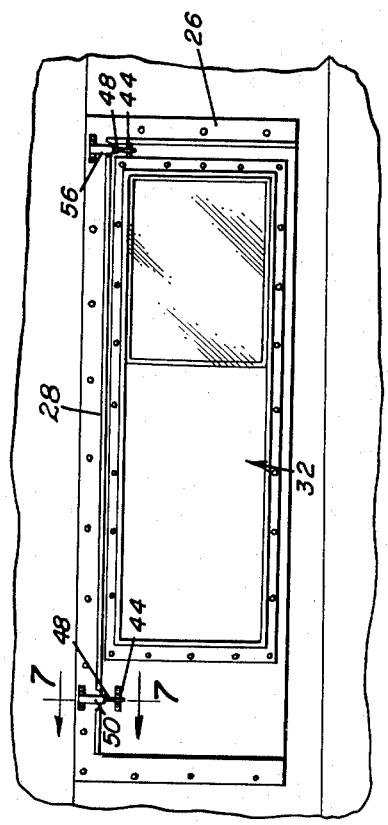
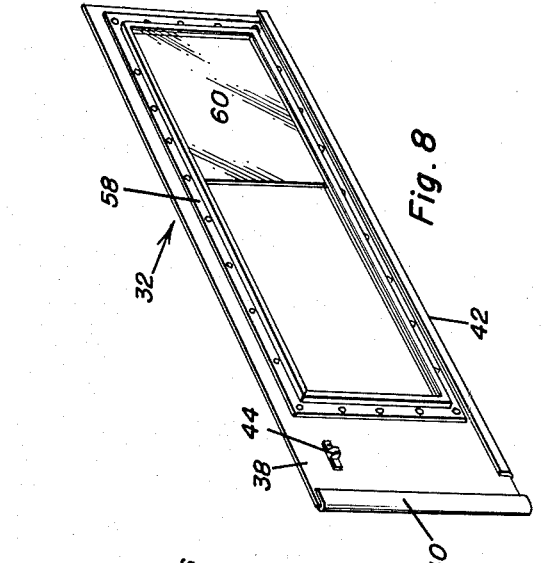
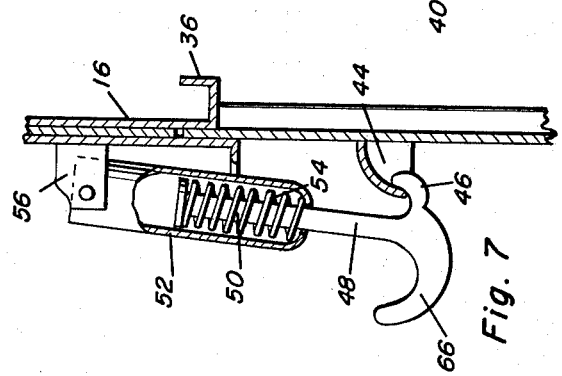
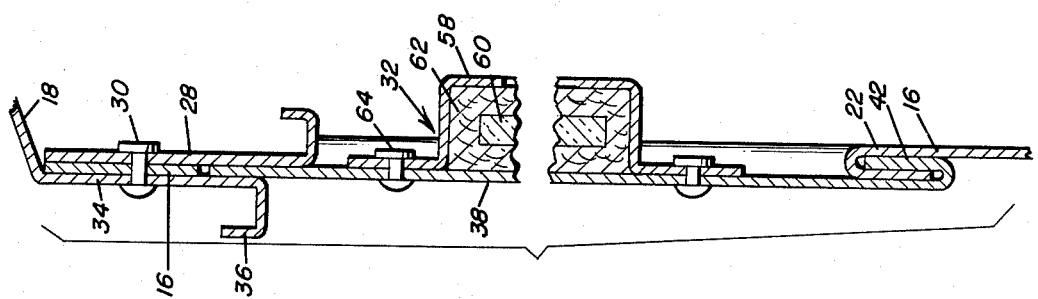
William W. Ward
Milton H. Ward
INVENTORS

United States Patent Office 2,714,865
Patented Aug. 9, 1955

2,714,865

SEPARABLE PANEL BOAT CABIN CONSTRUCTION

William W. Ward and Milton H. Ward, Monticello, Ark., assignors to Ward Brothers Manufacturing Co., Monticello, Ark.

Application August 31, 1953, Serial No. 377,366

5 Claims. (Cl. 114—0.5)

This invention relates to a novel boat construction and more particularly to a boat especially adapted to be quickly and easily converted from an enclosed cabin cruiser to an open cabin cruiser.

The primary object of the present invention resides in the provision of a novel construction of boats whereby a boat employing structures included in the concept of this invention will be readily and easily convertible from an enclosed cabin type of cruiser for use during winter months to a wide open and completely ventilated cabin cruiser for use during warmer periods.

The boat comprising the present invention is especially adapted for river and inshore navigation and the present invention includes side panels which are detachably secured to the cabin structure so as to enclose the cabin for use during inclement weather. The panels may be quickly and easily removed for adequate ventilation during warm periods and means are utilized to resiliently hold the panels in place so as to prevent any unnecessary noise or vibration.

Still further objects and features of this invention reside in the provision of a novel boat construction that is highly attractive in appearance, strong and durable, simple to manufacture and install, and which is capable of being utilized on various types of boats.

These, together with the various ancillary objects and features of the invention which will become apparent as the following description proceeds, are attained by the novel boat construction, a preferred embodiment of which has been illustrated in the accompanying drawings, by way of example only, wherein:

Figure 1 is an elevational view of a boat constructed in accordance with the concepts of the present invention;

Figure 2 is an enlarged horizontal sectional view as taken along the plane of line 2—2 of Figure 1;

Figure 3 is a partial perspective view of a portion of the cabin structure;

Figure 4 is a perspective detail view illustrating the interlap between the panel and the cabin structure;

Figure 5 is an enlarged vertical sectional view of a portion of the cabin with the panel installed;

Figure 6 is an enlarged side elevational view as taken from the inside of the boat and showing the panel in position;

Figure 7 is an enlarged vertical sectional detail view as taken along the plane of line 7—7 in Figure 6 and illustrating the construction of the clip lock used to resiliently lockingly hold the panels in position; and Figure 8 is a perspective view of one of the panels utilizing this invention.

With continuing reference to the accompanying drawings wherein like reference numerals designate similar parts throughout the various views, reference numeral 10 generally designates a boat constructed in accordance with the concepts of the present invention. The boat 10 is provided with a shallow draft hull 12 having an upwardly swept bow 14 so that the boat may be readily used for navigation in shallow water and so that the boat may be readily beached when desired. Thus, the boat 10 is especially adapted for river navigation such as on the Mississippi river and for other inshore uses. The boat 10 may be constructed from any suitable material and it has been found that plywood is especially adaptable for boats of this nature. The boat 10 is provided with a cabin 16 and of course has a front windshield together with a suitable supporting framework for an upper deck 18. It is to be noted that the cabin 16 may be formed from plywood or it may be formed from suitable sheet metal as may be the hull 12.

One edge portion of the framework of the cabin 16 is provided with a substantially U-shaped flange 20 and the bottom edge portion of the cabin 16 is provided with a substantially U-shaped flange 22. The forward portion of the cabin 16 has riveted thereto as at 24 a suitable molding 26 and the top and the upper portion of the cabin has affixed thereto a molding 28 held in place by rivets 30 or other suitable fasteners. The moldings 26 and 28 together with the flanges 20 and 22 define an enlarged opening in the cabin 16. This enlarged opening is adapted to be closed by panels such as that generally indicated by the reference numeral 32. It is to be noted that the upper deck 18 may be held in place by the rivets 30, the upper deck terminating in a downwardly extending portion 34 provided with a rain gutter 36, the portion 34 forming a portion of the cabin 16.

The panel 32 is constructed from a rectangular plate 38 having a substantially U-shaped edge portion 40 at the rear edge thereof and another substantially U-shaped edge portion 42 extending along the lower portion of the panel 32 and terminating a short distance from the after edge of the panel so as to permit the edge portions 42 and 40 to be slidingly inserted into locking engagement with the U-shaped flanges 20 and 22. The forward edge portions and the upper edge portions are received within the spaces between the moldings 26 and 28 and the rest of the cabin structure 16.

Attached to the panel 32 are locking brackets 44 of the construction as can be best seen in Figures 7 and 8. These locking brackets 44 are adapted to be engaged by the hook portions 46 of the locking strips 48. The locking strips 48 include plunger portions 50 received within a tubular housing 52 and resiliently urged inwardly by springs 54 thus continuously urging the hook portions 46 to resiliently engage the locking brackets 44. The housings 52 are pivotally mounted by suitable ears 56 or other attaching means to the cabin 16. Thus, the clip locks 48 assure that the panels 32 will be securely held in place and further prevent unnecessary vibrations and other noises from being induced into the panels 32 because of the resilient mountings afforded by the springs 54.

Each of the panels 32 has a peripheral substantially Z-shape in cross-section framework 58 extending about a window opening therein. The Z-shaped framework 58 is adapted to support a piece of glass 60 or other transparent material within the window opening so as to hold the cabin closed. The glass 60 is slidable within the guides formed by the plate 38 and the Z-shaped molding 58 and a front padding 62 is provided for cushioning the edges of the glass window 60. It is to be noted that the molding 58 is riveted as at 64 to the plate 38.

When it is desired to remove the panels 32 from the boat 10 it is merely necessary to detach the clip locks 48 using the handle 66 provided therefor. Then, the panels can be lowered from the inside and then stored for future use. When it is desired to reinstall the panels 32 due to inclement weather or other reasons, it is merely necessary to raise the panels into engagement between the moldings 26 and 28 and the rest of the cabin structure 16 with the U-shaped portions 40 and 42 interlocking with the U-shaped flanges 20 and 22. Then, the clip locks 48 can be engaged with the locking brackets 44.

Since from the foregoing the construction and advantages of this boat are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. A boat having a cabin provided with a framing about enlarged side openings and having molding about a portion of the interior periphery of said openings and outer frame portions extending about a portion of the exterior periphery of said openings, panels, means detachably securing said panels in said openings, said panels being received between said outer frame portions and said molding, portions of said cabin having substantially U-shaped flanges attached thereto at the periphery of said openings, said panels having substantially U-shaped rear edge portions interlocking with said U-shaped flanges.

2. A boat having a cabin provided with a framing about enlarged side openings and having molding about a portion of the interior periphery of said openings and outer frame portions extending about a portion of the exterior periphery of said openings, panels, means detachably securing said panels in said openings, said panels being received between said outer frame portions and said molding, portions of said cabin having substantially U-shaped flanges attached thereto at the periphery of said openings, said panels having substantially U-shaped rear edge portions interlocking with said U-shaped flanges, the outer frame portions at the upper edges of said openings comprising rain gutters.

3. A boat having a cabin provided with a framing about enlarged side openings and having molding about a portion of the interior periphery of said openings and outer frame portions extending about at least a portion of the exterior periphery of said openings, panels detachably secured in said openings, said panels being received between said outer frame portions and said molding, and resilient clip locks lockingly holding said panels in said opening, said clip locks including locking brackets attached to said panel, and spring urged retaining latch clips pivotally secured to said cabin.

4. A boat having a cabin provided with a framing about enlarged side openings and having molding about a portion of the interior periphery of said openings and outer frame portions extending about a portion of the exterior periphery of said openings, panels, means detachably securing said panels in said openings, said panels being received between said outer frame portions and said molding, portions of said cabin having substantially U-shaped flanges attached thereto at the periphery of said openings, said panels having substantially U-shaped rear edge portions interlocking with said U-shaped flanges, said means including resilient clip locks lockingly holding said panels in said opening, said clip locks including locking brackets attached to said panel, and spring urged retaining latch clips pivotally secured to said cabin.

5. A boat having a cabin provided with a framing about enlarged side openings and having molding about a portion of the interior periphery of said openings and outer frame portions extending about a portion of the exterior periphery of said openings, panels detachably secured in said openings, said panels being received between said outer frame portions and said molding, portions of said cabin having substantially U-shaped flanges attached thereto at the periphery of said openings, said panels having substantially U-shaped edge portions interlocking with said U-shaped flanges, the outer frame portions at the upper edges of said openings comprising rain gutters, and resilient clip locks lockingly holding said panels in said opening, said clip locks including locking brackets attached to said panel, and spring urged retaining latch clips pivotally secured to said cabin.

References Cited in the file of this patent

UNITED STATES PATENTS

| Number | Name | Date |
|---|---|---|
| 143,052 | Adams | Sept. 23, 1873 |
| 739,389 | Castle | Sept. 22, 1903 |
| 957,846 | Crates | May 10, 1910 |
| 1,211,907 | Allendorf | Jan. 9, 1917 |
| 1,249,897 | Buch | Dec. 11, 1917 |
| 1,295,893 | Hartz | Mar. 4, 1919 |
| 1,750,695 | Trumpy | Mar. 18, 1930 |
| 2,322,160 | Schlagel | June 15, 1943 |